(12) United States Patent
Slocum et al.

(10) Patent No.: US 7,640,180 B1
(45) Date of Patent: Dec. 29, 2009

(54) DEMAND PLANNING USING EXCHANGE BALANCES

(75) Inventors: Gregory H. Slocum, Dallas, TX (US); Amanpreet Singh, Irving, TX (US); Yap O. Guan, Singapore (SG); Wei Cao, Irving, TX (US); Narayan Venkatasubramanyan, Coppell, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1198 days.

(21) Appl. No.: 10/103,384

(22) Filed: Mar. 19, 2002

(51) Int. Cl.
  *G06F 17/30* (2006.01)
(52) U.S. Cl. ......................................................... 705/10
(58) Field of Classification Search .................... 705/10
  See application file for complete search history.

(56) References Cited

U.S. PATENT DOCUMENTS

| | | | | |
|---|---|---|---|---|
| 4,646,238 | A * | 2/1987 | Carlson et al. ................. | 700/95 |
| 5,450,317 | A * | 9/1995 | Lu et al. ........................ | 705/10 |
| 5,953,707 | A * | 9/1999 | Huang et al. ................... | 705/10 |
| 5,974,395 | A * | 10/1999 | Bellini et al. .................. | 705/9 |
| 6,049,742 | A * | 4/2000 | Milne et al. .................... | 700/99 |
| 6,119,102 | A * | 9/2000 | Rush et al. ..................... | 705/29 |
| 6,151,582 | A | 11/2000 | Huang et al. ................... | 705/10 |
| 6,393,332 | B1 * | 5/2002 | Gleditsch et al. .............. | 700/99 |
| 6,535,773 | B1 * | 3/2003 | Tsukishima et al. ........... | 700/99 |
| 6,699,727 | B1 * | 3/2004 | Toprac et al. .................. | 438/17 |
| 7,003,474 | B2 * | 2/2006 | Lidow ............................ | 705/7 |
| 7,089,196 | B2 * | 8/2006 | Hayes ........................... | 705/22 |
| 7,130,807 | B1 * | 10/2006 | Mikurak ......................... | 705/7 |
| 2002/0103686 | A1 * | 8/2002 | Slocum .......................... | 705/8 |
| 2002/0169657 | A1 * | 11/2002 | Singh et al. .................... | 705/10 |

FOREIGN PATENT DOCUMENTS

EP    0639815    *   2/1995

(Continued)

OTHER PUBLICATIONS

Padman, Rema, An Optimization Based Intelligent Decision Support System for Logistics Planning The University of Texas at Austin, Dissertation, Aug. 1986.*

(Continued)

*Primary Examiner*—Scott L Jarrett
(74) *Attorney, Agent, or Firm*—Booth Udall, PLC; Steven J. Laureanti

(57) ABSTRACT

A method for demand planning includes determining a demand value representing a demand quantity of an end product that a manufacturer is to produce. Production of the demand quantity of the end product includes production of a quantity of an intermediate product using a raw material. The intermediate product is to be further processed to produce the end product. The method also includes determining an additional quantity value representing an additional quantity of the intermediate product that the manufacturer can produce in addition to the quantity of the intermediate product used to produce the end product. At least one of the demand value and the additional quantity value is based at least partially on an exchange balance associated with at least one of the raw material, the intermediate product, and the end product. The method further includes making the additional quantity value for the intermediate product available for use in generating additional demand for the intermediate product.

35 Claims, 5 Drawing Sheets

FOREIGN PATENT DOCUMENTS

WO        WO 00/28451     *    5/2000

OTHER PUBLICATIONS

Klingman D. et al., The Challenges and Success Factors in Implementing an Integrated Products Planning System for Citgo Interfaces, May/Jun. 1986, vol. 16, No. 3, pp. 1-19.*
Klingman D. et al., An Optimization Based Integrated Short-Term Refined Petroleum Product Planning System Management Science, Jul. 1987, vol. 33, No. 7, pp. 813-830.*
Jager K. et al., A Decision Support System for Planning Chemical Production of Active Ingredients in a Pharmaceutical Company, Engineering Costs and Production Economics, vol. 17, Issues 1-4, Aug. 1989, Abstract.*
Klingman D. et al., An Intelligent Decision Support System for Supply, Distribution and Marketing Planning Computational Economics, vol. 3, No. 1, Mar. 1990, Abstract.*
So what does make MRP II software sutiable for process industries? Control and Instrumentation, Oct. 1991.*
Bolander, S. et al., System framework for process flow industries Production & Inventory Management Journal, vol. 34, No. 4, 1993.*
Logility Builds on the Success in the Chemical Market PR Newswire, Jan. 15, 1998.*
Citgo Petroleum Company Selects Logility Software to Assit in Supply Chain Planning PR Newswire, Feb. 24, 1998.*
Michel, Roberto, Global but plant-centric Manufacturing Systems, vol. 16, No. 11, Nov. 1998.*
Blomer, F. et al., Scheduling a Multi-Product Batch Process in the Chemical Industry Computers in Industry, vol. 36, 1998.*
Loos, P. et al., Application of Production Planning and Scheduling in the Process Industries Computers in Industry, vol. 36, 1998, pp. 199-208.*
Escudero, L.F. et al., CORO, a modeling an alogrithmic framework for oil supply, transformation and distribution optimization under uncertainty, European Journal of Operations Research, Vo. 114, 1999, pp. 638-656.*
Dempster Mah et al., Planning Logistics Operations in the Oil Industry Journal of the Operational Research Society, 2000, pp. 1271-1288.*
Aspen Announces Availability of eSupply Chain Suite to Optimize Flow of Knowledge and Materials for Process Manufacutring Industries, PR Newswire, Aug. 3, 2000.*
Supply chain technology (refining) Hydrocardon Processing, vol. 80, No. 9, Sep. 2001.*
Logility.com Web Pages Mar. 2000, Aug. 2000, Retrieved from Archive.org Aug. 25, 2006.*
Petrolsoft Introduces Wholesale Supply-Chain Planning Solution for Refiner-to-Terminal Distribution Business Wire, Aug. 2, 1999.*
Weitzel, Dale, How to manage your refining supply chain from E-to-E World Refining, vol. 10, No. 10, Dec. 31, 2000.*
Supply chain technology Hydrocarbon Processing, vol. 80, No. 9, Sep. 2001.*
OSHA Technical Manual—Petroleum Refining Processes Section IV: Chapter 2, Retrieved from Osha.gov Jan. 31, 2007.*
Harverly.com Web Pages Harverly, Inc., Mar. 2001, Retrieved from Archive.org Jan. 31, 2007.*
Petroleum Refinery Planning and Optimization Using Linear Programming Che Plus, Retrieved from www.cheresources.com/refinery_planning_optimization.shtml Jan. 31, 2007.*
Darwin, Klingman et al., The Sucessful Deployment of Management Science throughot Citgo Petroleum Corporation Interfaces, Jan.-Feb. 1987, vol. 17, No. 1, pp. 4-25.*
Fransoo, Jan Cornelis, Production control and demand management in capacitated flow process industries Technishe Universiteit Eindhoven, 1993, AAT C320771, Abstract.*
Korzeniowski, Paul et al., Trading Exchanges Have the 'Big mo', But Users Should Proceed with Caution SupplyChainBrain.com, Jun. 2000.*
Enterprise Profit Management for the Chemical Value Chain Accenture, Dec. 6, 2001.*
Hix, A.H., Status of Process Control Computers in the Chemical Industry Proceedings of the IEEE, vol. 58, No. 1, Jan. 1970, pp. 4-10.*
Lason, Leon S. et al., Survey of Nonlinear Programming Applications Operations Research, Sep.-Oct. 1980, pp. 1029-1073.*
Ronen, David, Dispatching Petroleum Products Operations Research, May-Jun. 1995, vol. 43, No. 3, pp. 379-387.*
Tinham, Brian, Make the process tiger perform Manufacturing Computer Solutions, vol. 6, No. 4, Apr. 2000, pp. 16-19.*
RPMS—Refinery and Petrochemical Modeling System Honeywell, Hi-Spect Solutions, Product Brochure, May 2000.*
Crama, et al.; A Discussion of Production Planning Approacheds in the Process Industry CORE DIscussion Paper, 2001.*
Process Industry Modeling System—Training Manual Part 1 Aspect Technology, Inc., Jun. 1, 1998.*
Process Industry Modeling System—Training Manual Part 2 Aspect Technology, Inc., Jun. 1, 1998.*
Webseter's II New Riverside Dictionary Houghton Mifflin Company, 1996, p. 98.*
WordNet.com—by-product definition Retrieved Apr. 15, 2008.*
Wikipedia.org—by-product definition Retrieved Apr. 15, 2008.*
Google.com—by-product definition Retrieved Apr. 15, 2008.*
U.S. Appl. No. 09/771,207, "System and Method for Demand Planning Using Sequential Forecasting," filed by Gregory H. Slocum, Jan. 26, 2001.

* cited by examiner

DEMAND PLANNING USING EXCHANGE BALANCES

RELATED APPLICATIONS

This Application is related to U.S. application Ser. No. 09/771,207, filed Jan. 26, 2001 by Slocum for a "System and Method for Demand Planning Using Sequential Forecasting."

TECHNICAL FIELD

This invention relates generally to demand planning, and more particularly to demand planning using exchange balances.

BACKGROUND

In the manufacturing industry, the production of finished end products often involves the production and use of intermediate products and by-products. Raw materials are processed into an intermediate product, possibly generating one or more by-products, and the intermediate product is then processed into the finished end product, possibly generating one or more additional by-products. For example, to produce foam seating cushions, a manufacturer may combine two raw materials, an amine and a phosgene. This produces isocyanate, an intermediate product, and hydrochloric acid, a by-product. The isocyanate is then processed further to form the foam cushions.

Manufacturers also often attempt to sell the intermediate products and by-products to other manufacturers or enterprises. This may provide additional sources of revenue. As another example, because a by-product may be a hazardous material, government regulations may prohibit the manufacturers from dumping or burning the by-product. Despite their desire to do so, many manufacturers have difficulty producing a consistent revenue stream or otherwise disposing of their intermediate products and/or by-products because they typically cannot predict customer demand for those products.

In addition, a first manufacturer may enter into an exchange contract with a second manufacturer. Under this contract, the first manufacturer may be required to supply a product to the second manufacturer in one geographic location, and the second manufacturer may be required to supply a product to the first manufacturer in another geographic location. Manufacturers typically do not consider the state or the terms of their exchange contracts when determining demand for a product and planning production of the products.

SUMMARY

According to the present invention, problems and disadvantages associated with previous demand planning techniques have been substantially reduced or eliminated.

In one embodiment of the invention, a system for demand planning includes memory containing an exchange balance associated with an entity that may supply at least one of a raw material, an intermediate product, and an end product to a manufacturer and that may receive at least one of the raw material, the intermediate product, and the end product from the manufacturer. The system also includes one or more processors collectively operable to determine a demand value representing a demand quantity of the end product that the manufacturer is to produce. Production of the demand quantity of the end product includes production of a quantity of the intermediate product using the raw material. The intermediate product is to be further processed to produce the end product. The one or more processors are also collectively operable to determine an additional quantity value representing an additional quantity of the intermediate product that the manufacturer can produce in addition to the quantity of the intermediate product used to produce the end product. At least one of the demand value and the additional quantity value is based at least partially on the exchange balance. The one or more processors are further collectively operable to make the additional quantity value for the intermediate product available for use in generating additional demand for the intermediate product.

In another embodiment of the invention, a system for demand planning includes memory containing an exchange balance associated with an entity that may supply at least one of a raw material, a by-product, and an end product to a manufacturer and that may receive at least one of the raw material, the by-product, and the end product from the manufacturer. The system also includes one or more processors collectively operable to determine a demand value representing a demand quantity of the end product that the manufacturer is to produce. Production of the demand quantity of the end product includes production of a quantity of the by-product that is not to be further processed to produce the end product. The one or more processors are also collectively operable to determine a quantity value representing a quantity of the by-product that would be produced during production of the end product. At least one of the demand value and the quantity value is based at least partially on the exchange balance. The one or more processors are further collectively operable to make the quantity value for the by-product available for use in generating additional demand for the by-product.

Numerous technical advantages may be provided according to various embodiments of the present invention. Particular embodiments of the invention may exhibit none, some, or all of the following advantages. For example, in one embodiment, a system for demand planning is provided. In particular, the system uses one or more exchange balances to model the status of an exchange contract between two manufacturers. The exchange balance may represent the status of the exchange contract between the manufacturers. The exchange balance may, for example, identify the quantity of a product that each manufacturer may obtain from and/or owe to the other manufacturer under the terms of the exchange contract. The use of exchange balances may allow the system to monitor the state of the exchange contracts. Because exchange contracts may impose a penalty when a manufacturer fails to supply a specified quantity of a product to an exchange balance or receive a specified quantity of a product from an exchange balance, this may help to reduce the likelihood that penalties will be imposed against the manufacturer. It may also allow the system to take the contract terms into consideration during a demand planning process, which may help the manufacturer to more efficiently use the materials available under the contract and to take advantage of the contract terms to a greater extent.

Another advantage of certain embodiments of the invention is that the manufacturer may earn more money through the sale of intermediate products and by-products. The system may allow a manufacturer to more accurately predict the amounts of intermediate products and/or by-products that can be produced in a given time period, taking into account any products to be supplied to or received from one or more exchange balances. Using this improved forecast, the manufacturer may then, for example, use its sales and marketing personnel to generate demand for appropriate amounts of the intermediate product and by-product. This may allow the manufacturer to set more profitable prices or obtain other more favorable contract terms for the sale of those products.

One or more other technical advantages may be readily apparent to one of skill in the art from the figures, description, and claims included herein.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF EXAMPLE EMBODIMENTS

Figure 1:
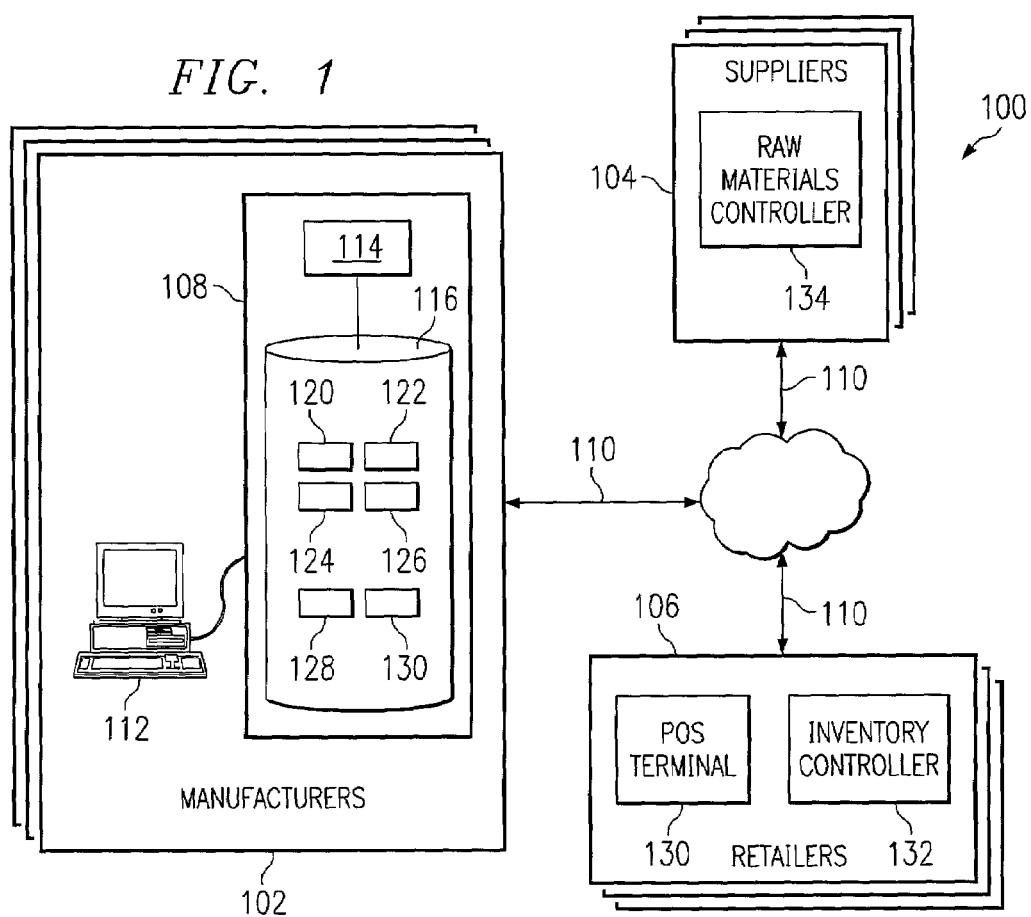
FIG. 1 illustrates an example system for demand planning using exchange balances.

FIG. 1 illustrates an example system 100 for demand planning using exchange balances. System 100 includes one or more manufacturers 102, one or more suppliers 104, and one or more retailers 106. Other embodiments of system 100 may be used without departing from the scope of the present invention.

Manufacturer 102 may be any suitable entity that manufactures at least one end product. Manufacturer 102 may use one or more intermediate products during the manufacturing process to produce the end product, and may produce one or more by-products during the manufacturing process in producing the end product. In this document, the phrase "end product" refers to any manufactured or processed product, the phrase "intermediate product" refers to any product produced during the manufacturing process and which is further processed to produce the end product, and the phrase "by-product" refers to any product produced during the manufacturing process and which is not further processed to produce the end product. A manufacturer 102 may, for example, produce and sell an end product, an intermediate product, or a by-product to another manufacturer 102, a supplier 104, a retailer 106, or other suitable person or enterprise. A supplier 104 may be any suitable entity that offers to sell raw materials to manufacturers 102. A retailer 106 may be any appropriate entity that purchases an end product, an intermediate product, or a by-product from manufacturer 102 to sell to its own customers. Although FIG. 1 illustrates manufacturers 102, suppliers 104, and retailers 106 as separate and distinct entities, the same person or enterprise could simultaneously act as a manufacturer 102, a supplier 104, and/or a retailer 106. For example, an enterprise acting as a manufacturer 102 could produce an end product, and the same enterprise could act as a supplier 104 to supply an intermediate product to another manufacturer 102.

Manufacturers 102, suppliers 104, and retailers 106 may be coupled to one another using links 110. Links 110 may each include one or more local area networks (LANs), metropolitan area networks (MANs), wide area networks (WANs), a portion of the global computer network known as the Internet, or any other appropriate wireline, wireless, or other links. In this document, the term "couple" refers to any direct or indirect communication between two or more elements in system 100, whether or not those elements are in physical contact with one another.

In one embodiment, manufacturers 102 may enter into exchange contracts with one another. Under an exchange contract, a first manufacturer 102 may be required to supply a raw material, an intermediate product, a by-product, and/or an end product to a second manufacturer 102. Also, the second manufacturer 102 may be required to supply the same or a different raw material, intermediate product, by-product, and/or end product to the first manufacturer 102. The use of exchange contracts may help both manufacturers 102 save money, such as by reducing transportation costs, import taxes, and export taxes. As a particular example, a first manufacturer 102 may have its manufacturing facilities in the United States and have a source of a raw material in Canada. A second manufacturer 102 may have its manufacturing facilities in Canada and have a source of the raw material in the United States. Under an exchange contract, the first manufacturer 102 may be required to supply the raw material to the second manufacturer 102 in Canada, while the second manufacturer 102 may be required to supply the raw material to the first manufacturer 102 in the United States. The exchange contract may specify minimum and maximum quantities of the product to be supplied in a given time period, a penalty if those requirements are violated, and/or any other suitable terms. The use of the exchange contract may reduce the distance over which each manufacturer 102 needs to ship its raw material, which helps to reduce the transportation costs involved in transporting the raw material. It may also help to reduce the import and export taxes charged to both manufacturers 102, since both manufacturers 102 may be able to ship the raw material without crossing any international borders. This is one specific example of a wide range of exchange contracts. Other suitable contract terms may be used according to particular needs without departing from the scope of the present invention. Also, the exchange contract described above represents a "like-for-like" contract, in that each manufacturer 102 supplies the same product, in this example a raw material, to the other. The exchange contract could also represent a "like-for-unlike" contract, where manufacturers 102 provide different products to one another.

In the illustrated embodiment, manufacturer 102 includes a demand server 108. In general, demand server 108 receives information concerning demand for an end product that is produced by manufacturer 102. Based on this and any other appropriate information, demand server 108 determines whether manufacturer 102 has the ability to produce additional amounts of one or more intermediate products used in producing the end product, in addition to the amounts of these intermediate products used to manufacture the end product. Demand server 108 also determines the amount of one or more by-products that manufacturer 102 will produce when manufacturing the end product and the one or more additional intermediate products.

Demand server 108 may take into account any exchange contracts when determining the demand for the end product, determining whether manufacturer 102 has the ability to produce additional amounts of one or more intermediate products, and determining the amount of one or more by-products that manufacturer 102 will produce. In one embodiment, a manufacturer 102 may enter into an exchange contract with another manufacturer 102, and demand server 108 may use one or more "exchange balances" to model the exchange contract. An exchange balance identifies a balance that represents the status of the exchange contract between manufacturers 102. For example, the exchange balance may identify the quantity of a product that each manufacturer 102 owes and/or is owed under the terms of the exchange contract. As a particular example, a first manufacturer 102 may provided one million units of a product to a second manufacturer 102 while the second manufacturer 102 provides two million units of the product to the first manufacturer 102. The exchange balance would indicate that the first manufacturer 102 owes one million units of the product to the second manufacturer 102 and that that second manufacturer 102 is owed one million units of the product from the first manufacturer 102.

In a particular embodiment, a manufacturer 102 may receive "debits" or "credits" in the exchange balance. If the first manufacturer 102 receives a product from the second manufacturer 102 under the exchange contract, the first manufacturer 102 earns a debit in the exchange balance, and the second manufacturer 102 earns a credit in the exchange balance. The debit indicates that the first manufacturer 102 owes the second manufacturer 102 some quantity of a product. In other words, the debit represents a commitment by the first manufacturer 102 to supply a quantity of the product to the second manufacturer 102 at some point in time. Likewise, the credit indicates that the second manufacturer 102 is owed some quantity of a product by the first manufacturer 102, so the credit represents a commitment by the second manufacturer 102 to accept a quantity of the product from the first manufacturer 102 at some point in time. In the above example, if the second manufacturer 102 later obtains the product from the first manufacturer 102, the second manufacturer 102 earns a debit in the exchange balance, which may reduce or eliminate the second manufacturer's credit and may even create a credit for the first manufacturer 102.

In this way, demand server 108 may monitor the current status of the exchange contract and determine whether a manufacturer 102 is complying with the terms of the contract and whether the manufacturer 102 may be subject to penalties for failing to comply with the contract terms. Also, the exchange balance may represent demands placed on each of the manufacturers 102, such as demands to produce a product for another manufacturer 102 and/or demands to accept a product from another manufacturer 102. Demand server 108 may consider these demands, along with other demands placed on a manufacturer 102, when performing demand planning operations for the manufacturer 102.

In one embodiment, demand server 108 may treat an exchange balance as a potential source of a product and/or a destination for a product. For example, two manufacturers 102 may agree to exchange a raw material under an exchange contract. Demand server 108 may view the exchange balance as a potential source for the raw material, from which a manufacturer 102 may obtain the raw material and produce one or more end products, intermediate products, and/or by-products. Demand server 108 may also view the exchange balance as a potential destination or "sink" for the raw material, to which the manufacturer 102 may supply the raw material to another manufacturer 102.

Manufacturer 102 may use the information generated by demand server 108, for example, to negotiate sales contracts with other manufacturers 102, suppliers 104, retailers 106, or any other suitable persons or enterprises. By more accurately identifying the amounts of the additional intermediate products and by-products produced by manufacturer 102, manufacturer 102 may negotiate more favorable contract terms, such as receiving a higher price for the products. By taking into account one or more exchange contracts, demand server 108 may monitor the status of the exchange contracts and help to ensure that manufacturer 102 complies with the terms of the contracts. This helps to reduce the likelihood that penalties will be imposed against manufacturer 102. Demand server 108 may also consider the exchange contracts in the demand planning process, which may allow manufacturer 102 to more efficiently use the materials available under the contract and take advantage of the contract terms to a greater extent.

Demand server 108 may include one or more processors 114 and a memory 116. Memory 116 may comprise any of a variety of data structures, arrangements, and/or compilations operable to store and facilitate retrieval of information. Memory 116 may, for example, comprise one or more volatile or non-volatile memory devices. Although FIG. 1 illustrates memory 116 as residing within demand server 108, memory 116 may reside in any location that is accessible by processor 114. Memory 116 receives and stores information related to demand planning operations for manufacturer 102, such as information related to the production of one or more end products, one or more intermediate products, and one or more by-products by manufacturer 102. Processor 114 processes information stored in memory 116 and performs demand planning operations for manufacturer 102.

Memory 116 may store and processor 114 may process any suitable information to perform demand planning operations in system 100. The following examples are for illustration only. Any other suitable type of information may be used in system 100 without departing from the scope of the present invention. Also, although the following description describes demand server 108 receiving information electronically from various sources, other collection methods may be used. For example, a user could enter the data manually into demand server 108 using a workstation, personal computer, or any other suitable user device 112.

In one embodiment, memory 116 stores manufacturing information 120 that describes the manufacturing process used to produce an end product. Manufacturing information 120 may identify, for example and without limitation, one or more raw materials used to begin production of the end product, the processing steps used to transform the raw materials into one or more intermediate products, the processing steps used to transform the one or more intermediate products into the end product, one or more by-products produced in producing the end product or one or more intermediate products, the amounts of intermediate product and by-product produced for a given amount of raw materials, and any other suitable manufacturing information.

Memory 116 may also store end product demand information 122 that can be used to determine a demand quantity of an end product, which represents the predicted future demand for the end product. For example, in one embodiment, demand server 108 may predict the future demand for an end product using historical, current, or projected end product orders received from other manufacturers 102, suppliers 104, and retailers 106. Demand server 108 could also predict the future demand for an end product using information from retailers 106. In this embodiment, end product demand information 122 may include sales information collected from one or more point of sale (POS) terminals 130 associated with one or more retailers 106 or otherwise. End product demand information 122 could further include sales information collected from one or more inventory controllers 132 associated with one or more retailers 106, where the inventory controller 132 predicts future sales of a product for a retailer 106 and transmits that prediction to demand server 108. Demand server 108 could further predict the future demand for an end product using information about the raw materials used to produce the end product. In this embodiment, end product demand information 122 could include information about the availability of raw materials provided by suppliers 104. For example, demand server 108 could receive information about the future availability of one or more raw materials from one or more raw materials controllers 134 associated with one or more suppliers 104. In addition, end product demand information 122 could include sales histories of the end product, price histories of the end product, information concerning related products, or any other suitable information that may be used to predict the demand for an end product.

Memory 116 may further store intermediate product information 124. In one embodiment, a manufacturer 102 may sell an end product as well as one or more intermediate products used to produce that end product. Intermediate product information 124 may include information that can be used to determine the potential demand for an intermediate product. In one embodiment, intermediate product information 124 could include information about how much additional intermediate product may be produced during a particular time period. This may include, for example, information identifying a maximum amount of the intermediate product that can be produced by the manufacturer 102. This may also include information identifying a reserve amount of the intermediate product, which represents the amount of the intermediate product needed to meet the predicted demand for the end product. Further, intermediate product information 124 could include sales histories of the intermediate product, price histories of the intermediate product, or any other suitable information that may be used to predict the availability of or demand for one or more intermediate products.

Memory 116 may also store by-product information 126. In one embodiment, a manufacturer 102 may sell an end product and one or more intermediate products, as well as one or more by-products produced during the manufacture of the end product and the one or more intermediate products. By-product information 126 may be used to determine the potential demand for the by-product. In one embodiment, by-product information 126 could include information identifying how much by-product will be produced during a particular time period. This may include, for example, information identifying an amount of the by-product that will be produced during the production of the end product. This may also include information identifying an amount of the by-product that will be produced during the production of at least a portion of the additional intermediate product that is produced and not used to manufacture the end product. In addition, by-product information 126 could include sales histories of the by-product, price histories of the by-product, or any other suitable information that may be used to predict the demand for or availability of one or more by-products.

Memory 116 may further store exchange balance information 128. Exchange balance information 128 contains information identifying the various characteristics of one or more exchange balances. For example, exchange balance information 128 may identify the raw material, intermediate product, by-product, and/or end product that a first manufacturer 102 agrees to supply to a second manufacturer 102. Exchange balance information 128 may also identify the same or a different raw material, intermediate product, by-product, and/or end product that the second manufacturer 102 agrees to supply to the first manufacturer 102. Exchange balance information 128 could further identify minimum and/or maximum quantities of the product that each manufacturer 102 agrees to supply to the other, as well as penalties for failing to meet the minimum quantity and maximum quantity terms. Exchange balance information 128 could also identify how the manufacturers 102 should ship the product and any other and/or additional contract terms. In addition, exchange balance information 128 could identify the current status of the exchange balance. For example, exchange balance information 128 could identify the debit or credit associated with each manufacturer 102, which indicates which manufacturer 102 has supplied more product to the other and to what extent.

In addition, memory 116 may store one or more business rules 130. Business rules 130 may incorporate different rules and policies of manufacturer 102, and demand server 108 may use business rules 130 in determining when to commit a product to an exchange balance and/or accept a product from an exchange balance. For example, a business rule 130 may specify that manufacturer 102 does not want to commit a quantity of a product to an exchange balance when the manufacturer's inventory of that product falls below a particular level. Another business rule 130 could specify that the manufacturer's debit or credit in the exchange balance should not exceed a specified level. Yet another business rule 130 could specify the amount that demand server 108 should utilize an exchange balance. For example, a business rule 130 may state that demand server 108 should attempt to obtain between three million and five million units of a product from another manufacturer 102 every quarter. In addition, different business rules 130 may be used by demand server 108 in different situations. For example, different sets of business rules 130 may be used for different exchange balances depending on the manufacturers 102 participating in an exchange balance. Different business rules 130 could also be used based on the identity of the product being obtained and/or supplied under an exchange contract. Other business rules 130 and types of business rules 130 may be used without departing from the scope of the present invention. Demand server 108 may use business rules 130 to determine when manufacturer 102 should obtain a product from and/or deliver a product to an exchange balance.

In operation, demand server 108 performs demand planning operations and takes into account the products available and/or owed under one or more exchange contracts. For example, in one embodiment, demand server 108 uses end product demand information 122 to predict the future demand for the end product. In one embodiment, an exchange contract may allow and/or require manufacturer 102 to obtain a quantity of the end product from another manufacturer 102, or the contract may obligate manufacturer 102 to supply a quantity of the end product to another manufacturer 102. Demand server 108 may use exchange balance information 128 to determine whether the predicted future demand for the end product may be satisfied, at least partially, by a quantity of the end product that could be obtained by manufacturer 102 from another manufacturer 102 under an exchange contract. If so, manufacturer 102 may be able to produce a smaller quantity of the end product, which could allow manufacturer 102 to produce additional quantities of other products that could be sold to its customers. Demand server 108 may then use one or more business rules 130 to determine whether the end product should be obtained under the exchange contract. Similarly, demand server 108 may use the exchange balance information 128 to determine whether the predicted future demand will be increased because a quantity of the end product needs to be supplied to another manufacturer 102 under an exchange contract. If so, manufacturer 102 may need to produce more of the end product, which might reduce the amount of other products to be produced by manufacturer 102. Demand server 108 may use one or more business rules 130 to determine whether the end product should be produced and delivered to another manufacturer 102 under the exchange contract.

In one embodiment, an exchange contract may also increase or decrease the quantity of a raw material available for use by manufacturer 102. For example, manufacturer 102 may be able to and/or required to obtain a quantity of a raw material under the contract, or manufacturer 102 may be obligated to supply a quantity of the raw material to another manufacturer 102 under the contract. Using exchange balance information 128 and business rules 130, demand server 108 determines whether the available quantity of a raw material should be increased or decreased because of the exchange balance. When manufacturer 102 may receive a quantity of the raw material, manufacturer 102 may be able to produce additional quantities of an end product or other products. When manufacturer 102 is obligated to supply a quantity of the raw material, manufacturer 102 may not have enough of the raw material to produce the end product and fully satisfy the predicted future demand. If manufacturer 102 lacks enough of the raw material to satisfy the predicted future demand of the end product, demand server 108 could take any suitable corrective action. For example, demand server 108 could attempt to procure additional quantities of the raw material through an electronic marketplace, or demand server 108 could attempt to arrange shipment of additional quantities of the raw material from a warehouse or other location associated with manufacturer 102. Demand server 108 could also reduce the amount of the end product to be produced for the customers of manufacturer 102, the amount of the end product to be produced for another manufacturer 102 under an exchange contract, and/or the amount of the raw material to be shipped to another manufacturer 102 under an exchange contract. Demand server 108 could further notify manufacturer 102 and allow manufacturer 102 to determine a suitable course of action.

Based on the predicted demand for the end product, demand server 108 may use manufacturing information 120 and intermediate product information 124 to determine whether additional amounts of one or more intermediate products can be produced and, if so, in what amounts. For example, demand server 108 may identify the quantity of an intermediate product that is needed to produce the end product so as to satisfy all of the predicted demand for the end product. Demand server 108 may then use exchange balance information 128 and business rules 130 to determine whether additional quantities of the intermediate product need to be produced and shipped to another manufacturer 102. If so, demand server 108 increases the quantity of the intermediate product needed by manufacturer 102. Demand server 108 may also use exchange balance information 128 and business rules 130 to determine whether at least a portion of the identified quantity of the intermediate product can be satisfied under an exchange contract. For example, manufacturer 102 may be able and/or may be required to obtain a quantity of the intermediate product from another manufacturer 102 under the exchange contract, which decreases the quantity of the intermediate product needed by manufacturer 102. After that, demand server 108 compares the quantity of the intermediate product needed by manufacturer 102 and the total quantity of the intermediate product that can be produced by manufacturer 102.

If the quantity of the intermediate product needed by manufacturer 102 is less than the total quantity of the intermediate product that can be produced by manufacturer 102, manufacturer 102 has the capacity to produce and sell additional quantities of the intermediate product. If the quantity of the intermediate product needed by manufacturer 102 is larger than the total quantity of the intermediate product that can be produced by manufacturer 102, manufacturer 102 cannot produce enough of the intermediate product, and demand server 108 may take any suitable corrective action. For example, demand server 108 could attempt to procure additional quantities of the intermediate product through an electronic marketplace or from a warehouse or other location. Demand server 108 could also reduce the amount of the end product to be produced for the customers of manufacturer 102 and/or the amount of an end product or intermediate product to be produced for another manufacturer 102 under an exchange contract. In addition, demand server 108 could notify manufacturer 102 and allow manufacturer 102 to determine a suitable course of action.

Demand server 108 may further use manufacturing information 120 and by-product information 126 to determine the amounts of one or more by-products that will be produced by manufacturer 102. For example, demand server 108 may identify the quantity of a by-product that will be produced during the manufacture of the end product. Demand server 108 may also identify the quantity of a by-product that will be produced during the manufacture of any additional quantities of one or more intermediate products. Demand server 108 may further use exchange balance information 128 and business rules 130 to determine whether manufacturer 102 may ship a quantity of the by-product to another manufacturer 102 under an exchange contract. If so, at least some of the by-product produced by manufacturer 102 may be shipped elsewhere, decreasing the amount of by-product to be disposed of by manufacturer 102. Demand server 108 may also use exchange balance information 128 and business rules 130 to determine whether manufacturer 102 must accept a quantity of the by-product from another manufacturer 102. If so, demand server 108 increases the amount of the by-product to be disposed of by manufacturer 102.

Demand server 108 may make this information available to manufacturer 102. For example, demand server 108 may notify manufacturer 102 of the additional quantity of an intermediate product can be produced, if any. Demand server 108 could also notify manufacturer 102 of a quantity of a by-product that needs to be disposed of, if any. Manufacturer 102 may, for example, use its sales and marketing resources to generate demand for the additional intermediate product and by-product, which may help to increase the revenue generated by manufacturer 102. Demand server 108 may also notify manufacturer 102 of any problems, such as when inadequate quantities of a raw material and/or intermediate product are available to produce an end product and satisfy all of the predicted future demand.

Although system 100 is primarily described as determining the amounts of both intermediate products and by-products that can be produced in a given time period, other embodiments may be used without departing from the scope of the present invention. For example, system 100 could determine the amounts of one or more intermediate products that can be produced by a manufacturer 102, without determining the amounts of one or more by-products produced. Similarly, system 100 could determine the amounts of one or more by-products that can be produced by a manufacturer 102, without determining the amounts of one or more intermediate products produced. Also, while system 100 has been described as using exchange balance information 128 to determine quantities of the end products, intermediate products, and by-products to be produced, other embodiments may be used without departing from the scope of the present invention. For example, the exchange contracts involving a manufacturer 102 could involve an end product without involving any intermediate products or by-products. Similarly, the exchange contracts involving a manufacturer 102 could involve an intermediate product without involving any end products or by-products, or the contracts could involve a by-product without involving any intermediate products or end products.

System 100 allows manufacturer 102 to more accurately predict the amounts of intermediate products and corresponding by-products that can be produced in a given time period. In particular, system 100 takes into account one or more exchange contracts in predicting the amounts of intermediate products and corresponding by-products that can be produced in a given time period. Using this information, manufacturer 102 may, for example, use its sales and marketing resources to generate the demand for appropriate amounts of the intermediate products and by-products. Manufacturer 102 may set more profitable prices or obtain other more favorable contract terms for the sale of those products, rather than being forced to sell the intermediate products or by-products at very low prices. Also, system 100 allows manufacturer 102 to monitor the status of its exchange contracts, which may help manufacturer 102 to comply with the contract terms and avoid having penalties imposed. In addition, manufacturer 102 may be able to run its manufacturing facilities at a higher capacity. Using the improved forecast produced by demand server 108, if manufacturer 102 is not operating its facilities at full capacity, manufacturer 102 can use those facilities to produce additional quantities of the intermediate products and by-products. This increases the amount of product that can be sold and decreases the length of time it takes to recover the costs of the equipment in the facility.

Although FIG. 1 illustrates an example embodiment of system 100, various changes may be made without departing from the scope of the present invention. For example, the components of demand server 108 may operate on one or more computers at one or more locations. Although demand server 108 is described primarily as being separate from suppliers 104 and retailers 106, demand server 108 may share one or more computer or other appropriate resources with one or more suppliers 104 or retailers 106 according to particular needs. Also, information 120-128 may be provided to demand server 108 electronically, by a user, or in any other suitable manner. In addition, the functionality of demand server 108 may be implemented on any computing device or devices, such as a desktop computer, a laptop computer, or a personal digital assistant. Other changes may be made to system 100 without departing from the scope of the present invention.

Figure 2:
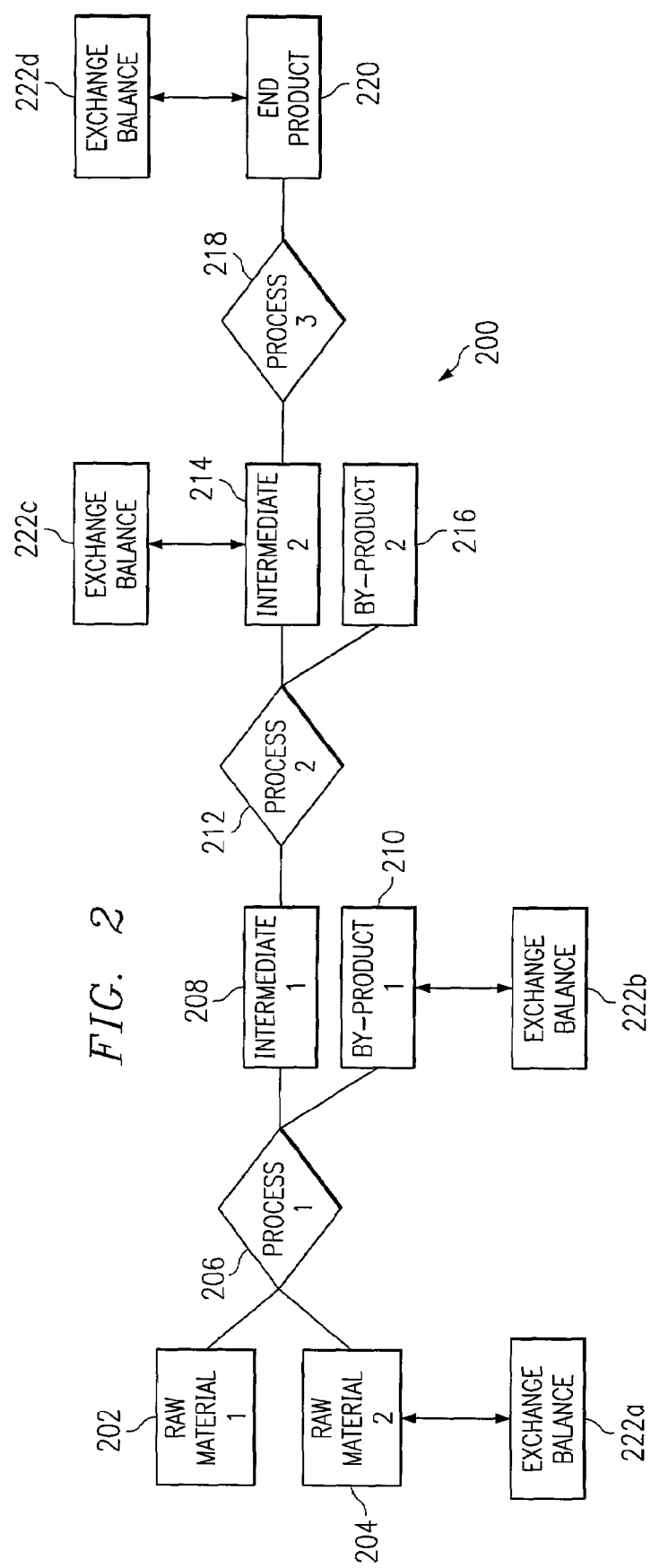
FIG. 2 illustrates example exchange balances in a manufacturing process of a manufacturer.

FIG. 2 illustrates example exchange balances 222 in a manufacturing process 200 of a manufacturer 102. The process illustrated in FIG. 2 represent the steps used to transform two raw materials 202 and 204 into an end product 220. The process illustrated in FIG. 2 is for illustration only. A manufacturer 102 may use any suitable process to manufacture an end product 220.

Raw materials 202 and 204 are combined in a first process 206 into a first intermediate product 208. As a result of process 206, a first by-product 210 also forms. The first intermediate product 208 undergoes a second process 212 and is formed into a second intermediate product 214. A second by-product 216 is also formed during the second process 212. The second intermediate product 214 undergoes a third process 218 and is formed into end product 220.

As shown in FIG. 2, example exchange balances 222a-222d are associated with raw material 204, by-product 210, intermediate product 214, and end product 220, respectively. Each exchange balance 222 represents a possible source of a product and/or a potential destination for a product under one or more exchange contracts. For example, exchange balance 222a may represent a source of raw material 204 for manufacturer 102, such as when manufacturer 102 may receive raw material 204 from another manufacturer 102. Exchange balance 222a could also represent a destination for raw material 204, such as when manufacturer 102 is obligated to supply raw material 204 to another manufacturer 102. Similarly, exchange balances 222b-222d may represent a source of or destination for by-product 210, intermediate product 214, and end product 220, respectively.

A manufacturer 102 that performs process 200 may use system 100 to analyze the potential demand for intermediate products 208 and 214 and/or by-products 210 and 216. System 100 may take into account the products available from and/or destined for exchange balances 222 in analyzing the potential demand for intermediate products 208 and 214 and/or by-products 210 and 216. As an example, system 100 may determine the future demand for an end product 220 by the manufacturer's customers. If system 100 determines that the future demand for end product 220 may be partially or totally satisfied using products from exchange balance 222d, manufacturer 102 may be able to produce smaller quantities of end product 220. This enables manufacturer 102 to produce larger quantities of intermediate products 208 and/or 214. If system 100 determines that the future demand for end product 220 must be increased because a quantity of end product 220 needs to be shipped to exchange balance 222d, manufacturer 102 may be required to produce larger quantities of end product 220. This increases the quantities of intermediate products 208 and 214 needed to produce end product 220, which may reduce the quantities of intermediate products 208 and 214 that can be produced and sold separately.

Demand server 108 may make similar use of exchange balances 222a and 222c. For example, demand server 108 may determine whether exchange balances 222a and 222c represent possible sources and/or destinations of raw material 204 and intermediate product 214, respectively. If an exchange balance 222a or 222c represents a source of a product, such as raw material 204 or intermediate product 214, manufacturer 102 may be able to produce additional amounts of end product 220, intermediate product 208, and/or intermediate product 214. If an exchange balance 222a or 222c represents a destination for a product, such as raw material 204 or intermediate product 214, manufacturer 102 may be forced to supply raw material 204 or intermediate product 214 to another manufacturer 102. This may reduce the amount of raw material 204 or intermediate product 214 available to the manufacturer 102, which may cause manufacturer 102 to produce smaller amounts of end product 220, intermediate product 208, and/or intermediate product 214.

Exchange balance 222b may represent a possible way for manufacturer 102 to dispose of by-product 210, or it may represent an additional source of by-product 210 to be disposed of by manufacturer 102. If manufacturer 102 is allowed to supply by-product 210 to another manufacturer 102 under an exchange contract, this reduces the quantity of by-product 210 to be disposed of by manufacturer 102. If manufacturer 102 is obligated to receive by-product 210 from another manufacturer 102 under an exchange contract, this increases the quantity of by-product 210 to be disposed of by manufacturer 102.

As just an example, after considering the various information related to the demand planning operations, including any exchange balances 222, system 100 may determine that the manufacturer 102 possesses the manufacturing capacity to produce additional quantities of the first intermediate product 208. This excess quantity of the first intermediate product 208 could be sold to other manufacturers 102, suppliers 104, retailers 106, or any other persons or enterprises. System 100 may also, as just an example, determine the amount of by-product 210 that will be produced and that is disposed of through exchange balance 222b. The manufacturer 102 may use its sales and marketing resources to generate demand for the intermediate product 208 that is equal to or less than the amount of excess intermediate product 208 identified by system 100. The manufacturer 102 may also use its sales and marketing resources to generate demand for the by-product 210 that is equal to or less than the amount of by-product 210 identified by system 100.

As a more particular example, raw material 202 may include a silicon metal, and raw material 204 may include a methyl chloride. First process 206 combines the silicon metal and the methyl chloride to form an intermediate product 208, dimethyl dichlorosilane, and several by-products 210, including trichlorosilane. Second process 212 hydrates the first intermediate product 208 and forms a second intermediate product 214, hydrolyzate, and a second by-product 216, hydrochloric acid. The second by-product 216 may be recycled in the process 200, for example, by using it to form additional amounts of raw material 204. Third process 218 polymerizes the second intermediate product 214 to form an end product 220, dimethyl fluids.

A manufacturer 102 may choose to sell the end product 220, dimethyl fluids, to other manufacturers 102, suppliers 104, or retailers 106. After taking into consideration one or more of the exchange balances 222, system 100 may determine that the manufacturer 102 also possesses the ability to produce additional amounts of the first intermediate product 208, dimethyl dichlorosilane. This excess intermediate product 208 can also be sold to other manufacturers 102, suppliers 104, or retailers 106. After taking into consideration the quantity of by-product 210 disposed of or received through exchange balance 222b, system 100 may also determine the amount of by-product 210 to be disposed of by manufacturer 102. The manufacturer 102 may then use its sales and marketing resources to generate a demand for the first intermediate product 208, dimethyl dichlorosilane, that is equal to or less than the amount of excess intermediate product 208 determined by system 100. The manufacturer 102 may also use its sales and marketing resources to generate demand for by-product 210, the trichlorosilane, that is equal to or less than the amount of by-product 210 identified by system 100. To prevent a build-up of by-product 210, the manufacturer 102 may attempt to sell all of the by-product 210 that will be produced during a given time period.

Although the example described above involves a chemical process, system 100 could be used with respect to any process-oriented industry. As examples and without limitation, system 100 could be used in the metal processing industry, the food processing industry, or the glass processing industry. Also, while FIG. 2 illustrates one example series of processing steps 200, any other suitable processing steps may be performed by a manufacturer 102 without departing from the scope of the present invention. For example, manufacturer 102 may produce intermediate products 208 and 214, without producing by-products 210 and 216. As another example, manufacturer 102 may combine two raw materials 202 and 204 to produce an end product 220 and a by-product 210, without producing any intermediate products 208 and 214. In addition, while FIG. 2 illustrates the use of four example exchange balances 222a-222d, any suitable number of exchange balances 222 may be associated with one or more raw materials, intermediate products, by-products, and/or end products. Also, more than one exchange balance 222 may be associated with a particular raw material, intermediate product, by-product, or end product. This may be useful, for example, where a manufacturer 102 enters into multiple exchange contracts involving the same raw material, intermediate product, by-product, or end product.

Figure 3:
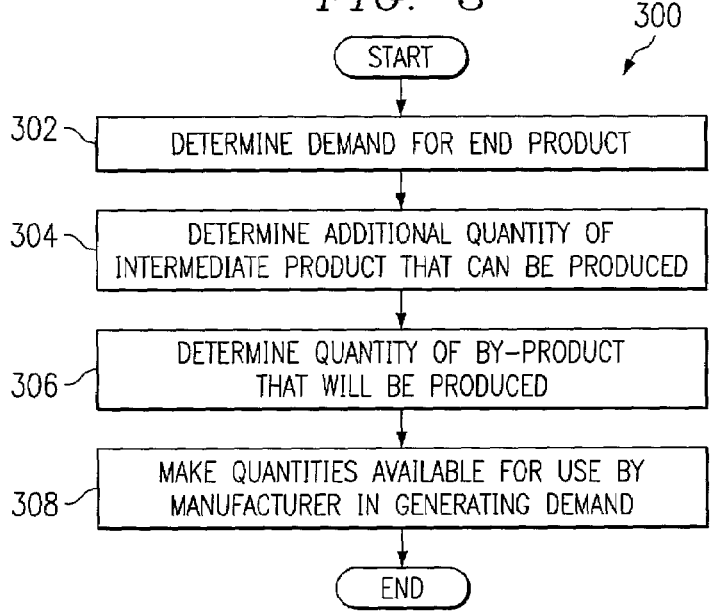
FIG. 3 illustrates an example method for demand planning using exchange balances.

FIG. 3 illustrates an example method 300 for demand planning using exchange balances. The method 300 beings at step 302, where demand server 108 determines a demand for an end product. This may include, for example, demand server 108 receiving information from one or more POS terminals 130, inventory controllers 132, raw materials controllers 134, system operators using devices 112, or any other suitable sources of information. This may also include demand server 108 predicting the expected future demand for the end product, using any suitable technique. This may further include demand server 108 increasing or decreasing the predicted demand using one or more exchange balances 222 associated with the end product. Demand server 108 may use one or more business rules 130 to determine whether a quantity of the end product should be obtained from and/or delivered to one or more exchange balances.

At step 304, demand server 108 determines an additional quantity of an intermediate product that can be produced. This may include, for example, demand server 108 determining the total amount of the intermediate product that manufacturer 102 can produce. This may also include demand server 108 determining an amount of the intermediate product needed to meet the predicted demand for the end product. This may further include demand server 108 increasing or decreasing the quantity of the intermediate product needed by manufacturer 102 using one or more exchange balances 222 associated with the intermediate product. If demand server 108 determines that manufacturer 102 needs more of the intermediate product than manufacturer 102 can produce and/or obtain from an exchange balance 222, demand server 108 may take one or more corrective actions. This may include, for example, demand server 108 procuring additional quantities of the intermediate product through an electronic marketplace or from a warehouse or other location, reducing the amount of the end product to be produced for the customers of manufacturer 102, reducing the amount of an end product or intermediate product to be produced for an exchange balance 222, and/or notifying manufacturer 102 of the problem. Although method 300 is described as involving a single intermediate product, method 300 may involve any number of intermediate products according to particular needs.

At step 306, demand server 108 determines a quantity of a by-product that will be produced. This may include, for example, demand server 108 determining an amount of the by-product that will be produced during the production of the end product. This may also include demand server 108 determining an amount of the by-product that will be produced during the production of at least a portion of the additional intermediate product described above with reference to step 304. This may further include demand server 108 increasing or decreasing the quantity of the by-product to be disposed of by manufacturer 102 using one or more exchange balances 222 associated with the by-product. Although method 300 is described as involving a single by-product, method 300 may involve any number of by-products according to particular needs.

At step 308, demand server 108 makes the quantities of the intermediate product and by-product available to manufacturer 102. Manufacturer 102 may, for example, use its sales and marketing resources to generate demand for the intermediate product that is equal to or less than the amount determined at step 304. Instead or in addition, manufacturer 102 may use its sales and marketing resources to generate demand for the by-product that is equal to or less than the amount determined at step 306.

Although FIG. 3 illustrates determining the amounts of both intermediate products and by-products that can be produced in a given time period, other embodiments of method 300 may be used without departing from the scope of the present invention. For example, demand server 108 could determine the amounts of one or more intermediate products that can be produced by a manufacturer 102 at step 304 without determining the amounts of one or more by-products at step 306. Demand server 108 could also determine the amounts of one or more by-products that can be produced by a manufacturer 102 at step 306, without determining the amounts of one or more intermediate products at step 304.

Figure 4:
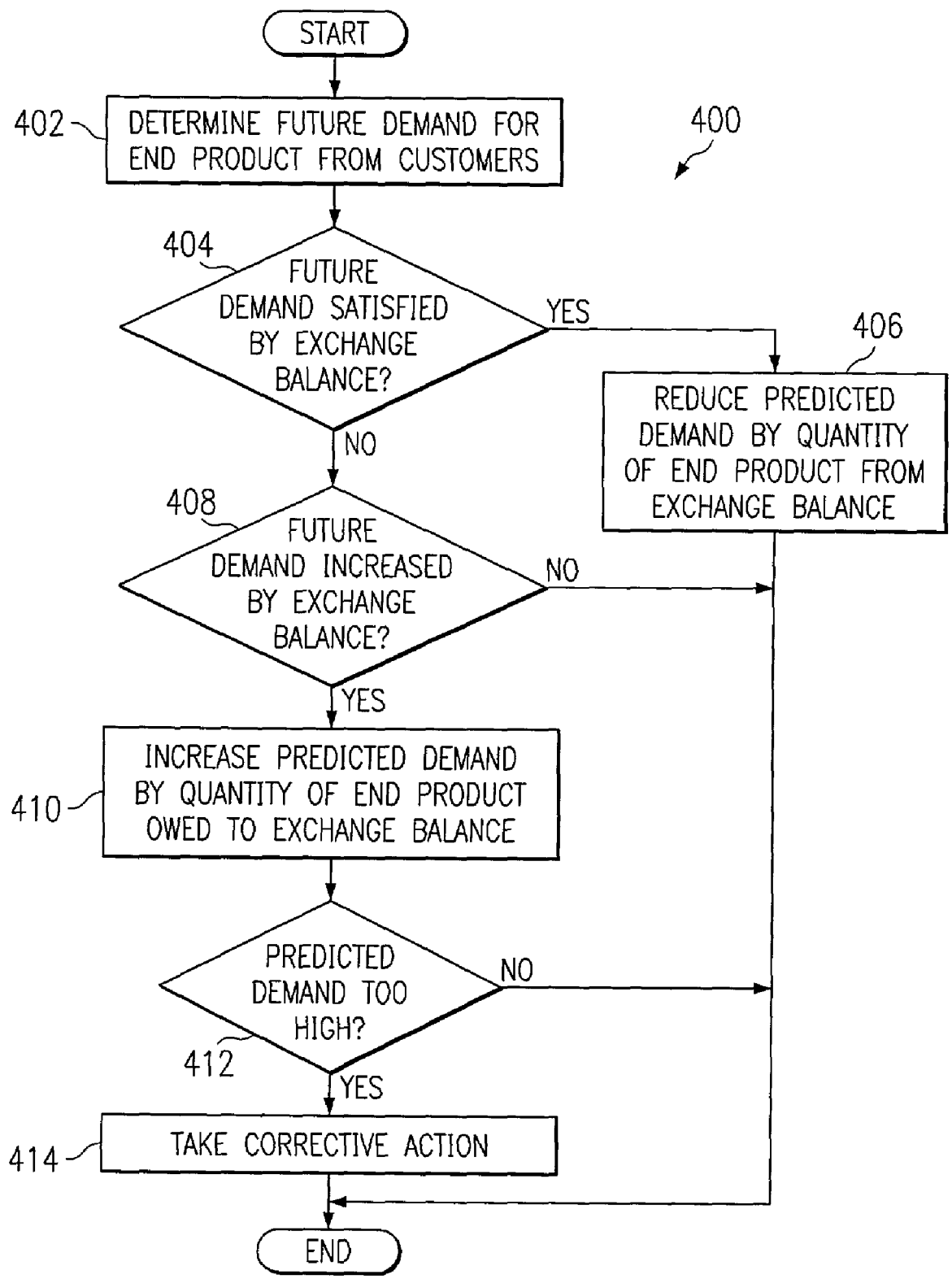
FIG. 4 illustrates an example method for identifying predicted demand for an end product.

FIG. 4 illustrates an example method 400 for identifying predicted demand for an end product. The method 400 begins at step 402, where demand server 108 determines a predicted future demand for the end product. This may include, for example, demand server 108 using end product demand information 122. In a particular embodiment, this may include demand server 108 using historical, current, or projected end product orders received from other manufacturers 102, suppliers 104, and retailers 106. This may also include demand server 108 using information from retailers 106 and/or suppliers 104, such as information collected from one or more POS terminals 130, one or more inventory controllers 132, and one or more raw materials controllers 134.

At step 404, demand server 108 determines whether the predicted future demand for the end product can be satisfied, at least partially, by products received through an exchange balance. This may include, for example, demand server 108 using exchange balance information 128 to determine whether an exchange balance is associated with the end product and, if so, whether a quantity of the end product is available through the exchange balance. This may also include demand server 108 using one or more business rules 130 to determine whether a quantity of the end product should be obtained through the exchange balance. If the predicted demand for the end product can be at least partially satisfied using products from one or more exchange balances, at step 406 demand server 108 reduces the predicted demand for the end product by the quantity of the end product to be obtained through the exchange balance. In this case, manufacturer 102 may satisfy at least some of the predicted demand for the end product using products obtained through the exchange balance, and manufacturer 102 may be able to produce less of the end product itself.

If the predicted demand for the end product cannot be satisfied using products from one or more exchange balances, at step 408 demand server 108 determines whether the predicted future demand for the end product should be increased because manufacturer 102 needs to supply a quantity of the end product to one or more exchange balances. This may include, for example, demand server 108 using exchange balance information 128 to determine whether an exchange balance is associated with the end product and, if so, whether a quantity of the end product is to be supplied to another manufacturer 102 through the exchange balance. This may also include demand server 108 using one or more business rules 130 to determine whether a quantity of the end product should be supplied through the exchange balance. If demand server 108 determines that manufacturer 102 should supply a quantity of the end product to the exchange balance, at step 410 demand server 108 increases the predicted demand for the end product by the quantity of the end product to be supplied to the exchange balance. In this case, manufacturer 102 may need to produce a larger quantity of the end product to satisfy the demands placed on manufacturer 102.

At step 412, demand server 108 determines whether the increased predicted demand exceeds the manufacturing capabilities of manufacturer 102. This may include, for example, demand server 108 determining whether the increased predicted demand is greater than the total quantity of the end product that manufacturer 102 can produce in the specified time period. If not, method 400 ends. Otherwise, manufacturer 102 may not be able to produce enough of the end product to meet the demand of its customers and supply the end product to the exchange balance. At step 414, demand server 108 may take one or more corrective actions. This may include, for example, demand server 108 procuring additional quantities of the end product through an electronic marketplace or from a warehouse or other location, reducing the amount of the end product to be produced for the customers of manufacturer 102, reducing the amount of the end product to be produced for an exchange balance, and/or notifying manufacturer 102 of the problem. This may also include manufacturer 102 and/or demand server 108 deciding to reduce the amount of the end product to be produced for an exchange balance. For example, manufacturer 102 may determine it would rather pay the penalty for failing to supply the end product to another manufacturer 102 under an exchange contract, rather than risk alienating current customers. Manufacturer 102 and/or demand server 108 may take any other or additional corrective actions without departing from the scope of the present invention.

Although FIG. 4 illustrates determining the predicted demand for an end product using one or more exchange balances, other embodiments of method 400 may be used without departing from the scope of the present invention. For example, a manufacturer 102 may not enter into any exchange contracts involving the end product, and demand server 108 could determine the predicted demand for the end product without using an exchange balance. Also, one or multiple exchange contracts may be associated with the end product. Further, demand server 108 may both reduce the predicted demand for the end product using at least one exchange balance and increase the predicted demand for the end product using at least one other exchange balance. In addition, method 400 may be performed for one or more end products serially, simultaneously, or otherwise.

Figure 5:
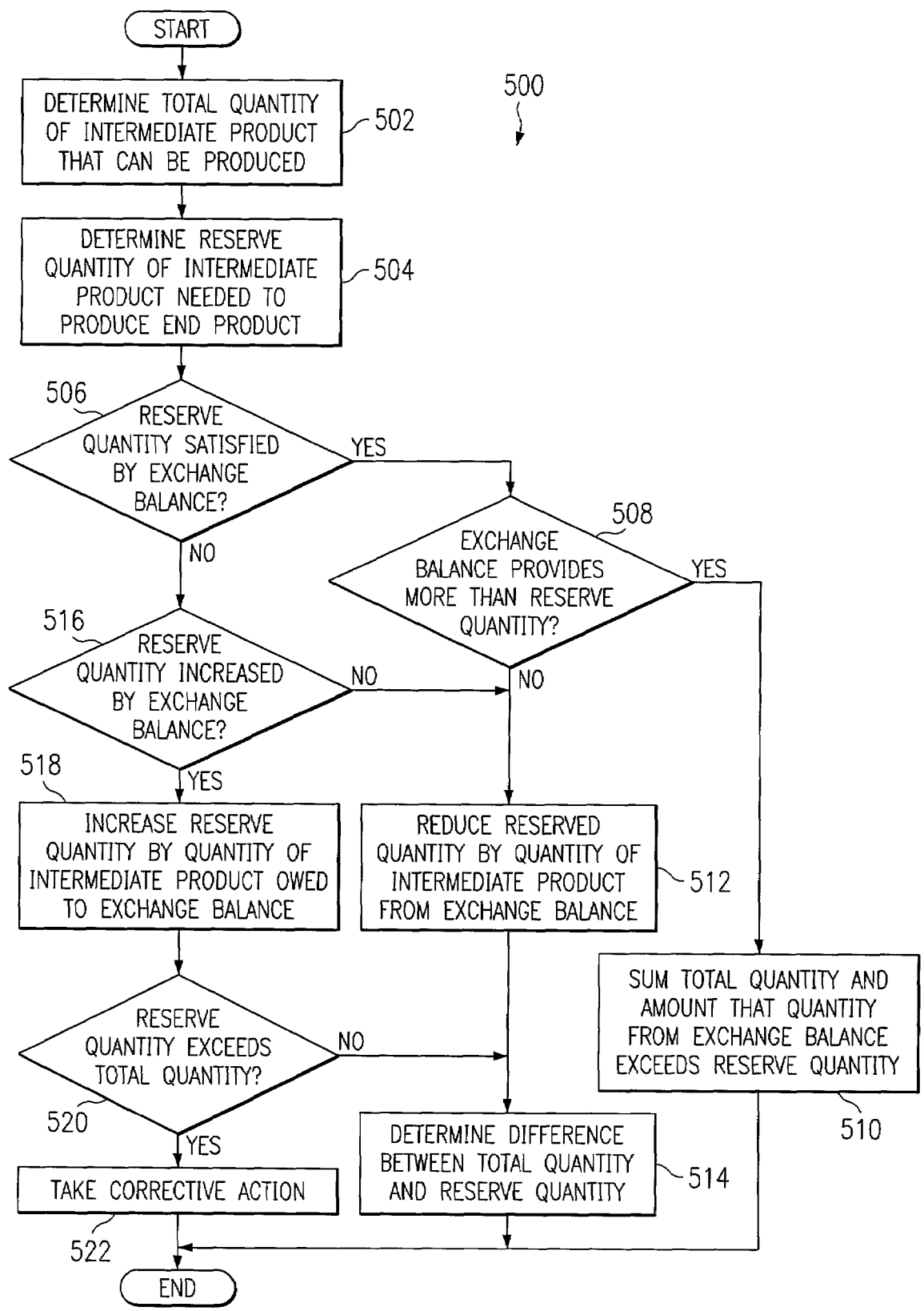
FIG. 5 illustrates an example method for identifying predicted demand for an intermediate product.

FIG. 5 illustrates an example method 500 for identifying predicted demand for an intermediate product. The method 500 begins at step 502, where demand server 108 determines a total quantity of an intermediate product that can be produced by manufacturer 102. This may include, for example, demand server 108 using manufacturing information 120 to determine how much of the intermediate product can be produced in a given time period. At step 504, demand server 108 determines a reserve quantity of the intermediate product. The reserve quantity represents the amount of the intermediate product that will be used to produce the end product. Demand server 108 may, for example, use the manufacturing information 120 and the predicted demand for the end product to determine the reserve amount.

At step 506, demand server 108 determines whether the reserve quantity of the intermediate product can be satisfied, at least partially, by products received through an exchange balance. This may include, for example, demand server 108 using exchange balance information 128 to determine whether an exchange balance is associated with the intermediate product and, if so, whether a quantity of the intermediate product is available through the exchange balance. This may also include demand server 108 using one or more business rules 130 to determine whether a quantity of the intermediate product should be obtained through the exchange balance.

If the reserve quantity of the intermediate product can be at least partially satisfied using products from one or more exchange balances, at step 508 demand server 108 determines whether manufacturer 102 is required to accept a quantity of the intermediate product that is larger than the reserve quantity. This may include, for example, demand server 108 determining that the terms of the exchange contract associated with the exchange balance and/or one or more business rules 130 require manufacturer 102 to accept the quantity from the exchange balance. If manufacturer 102 is required to accept a quantity of the intermediate product that is larger than the reserve quantity, at step 510 demand server 108 sums the total quantity of the intermediate product and the amount that the quantity from the exchange balance exceeds the reserve quantity. In this case, all of the reserve quantity of the intermediate product may be satisfied from the exchange balance. Manufacturer 102 could produce and sell the total quantity of the intermediate product, and manufacturer 102 also receives an additional quantity of the intermediate product from the exchange balance that can be sold.

If the quantity of the intermediate product from the exchange balance is not larger than the reserve quantity, at step 512 demand server 108 reduces the reserve quantity of the intermediate product by the quantity of the intermediate product to be obtained through the exchange balance. At step 514, demand server 108 determines a difference between the total quantity and the reserve quantity of the intermediate product. The difference represents the excess amount of the intermediate product that manufacturer 102 can produce and sell to other manufacturers 102, suppliers 104, retailers 106, or any other persons or enterprises. Accordingly, the manufacturer 102 may use its sales and marketing resources to generate demand for the intermediate product that is equal to or less than the amount determined at step 514.

If the reserve quantity of the intermediate product cannot be satisfied using products from one or more exchange balances, at step 516 demand server 108 determines whether the reserve quantity of the intermediate product should be increased because manufacturer 102 needs to supply a quantity of the intermediate product to one or more exchange balances. This may include, for example, demand server 108 using exchange balance information 128 to determine whether an exchange balance is associated with the intermediate product and, if so, whether a quantity of the intermediate product is to be supplied to another manufacturer 102 through the exchange balance. This may also include demand server 108 using one or more business rules 130 to determine whether a quantity of the intermediate product should be supplied through the exchange balance. If demand server 108 determines that manufacturer 102 should supply a quantity of the intermediate product to the exchange balance, at step 518 demand server 108 increases the reserve quantity of the intermediate product by the quantity of the intermediate product to be supplied to the exchange balance. In this case, manufacturer 102 may need to produce a larger quantity of the intermediate product to satisfy the demands placed on manufacturer 102.

At step 520, demand server 108 determines whether the increased reserve quantity exceeds the manufacturing capabilities of manufacturer 102. This may include, for example, demand server 108 determining whether the increased reserve quantity is greater than the total quantity of the intermediate product that manufacturer 102 can produce in the specified time period. If not, demand server 108 proceeds to step 514 to determine the amount of excess intermediate product that manufacturer 102 can produce and sell. Otherwise, manufacturer 102 may not be able to produce enough of the intermediate product to produce all of the end product and supply the intermediate product to the exchange balance. At step 522, demand server 108 may take one or more corrective actions. This may include, for example, demand server 108 procuring additional quantities of the intermediate product, reducing the amount of the end product to be produced for the customers of manufacturer 102, reducing the amount of the intermediate product to be produced for an exchange balance, and/or notifying manufacturer 102 of the problem. Manufacturer 102 and/or demand server 108 may take any other or additional corrective actions without departing from the scope of the present invention.

Although FIG. 5 illustrates determining the predicted demand for an intermediate product using one or more exchange balances, other embodiments of method 500 may be used without departing from the scope of the present invention. For example, a manufacturer 102 may not enter into any exchange contracts involving the intermediate product, and demand server 108 could determine the predicted demand for the intermediate product without using an exchange balance. Also, one or multiple exchange contracts may be associated with the intermediate product. Further, demand server 108 may both reduce the reserve quantity of the intermediate product using at least one exchange balance and increase the reserve quantity of the intermediate product using at least one other exchange balance. In addition, method 500 may be performed for one or more intermediate products serially, simultaneously, or otherwise.

Figure 6:
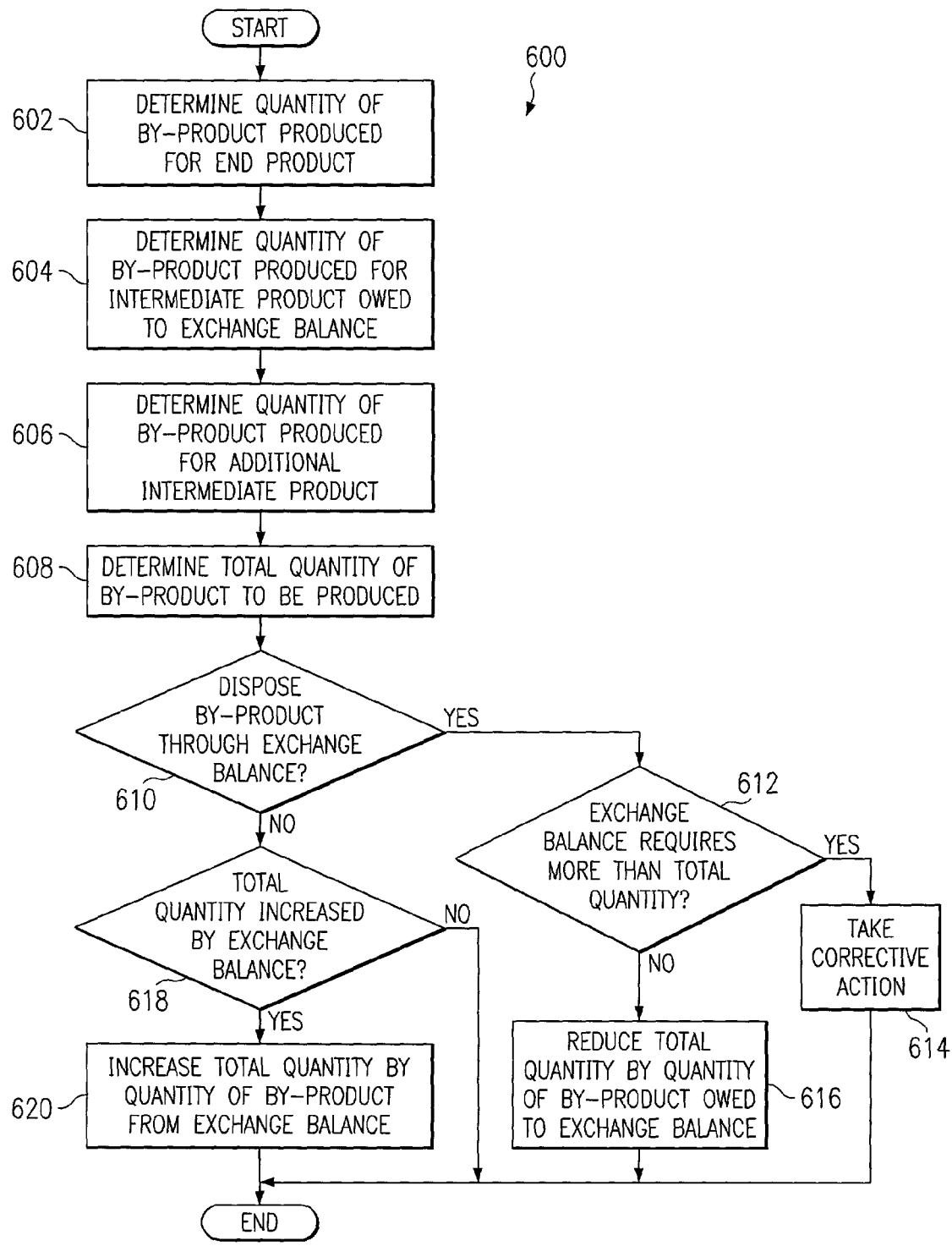
FIG. 6 illustrates an example method for identifying predicted demand for a by-product.

FIG. 6 illustrates an example method 600 for identifying predicted demand for a by-product. The method 600 begins at step 602, where demand server 108 determines a quantity of the by-product that will be produced during production of the end product at step 602. This may include, for example, demand server 108 using manufacturing information 120 and the predicted demand for the end product to determine the amount of the by-product that will be produced. At step 604, demand server 108 determines a quantity of the by-product that will be produced during production of any intermediate product owed to one or more exchange balances. This may include, for example, demand server 108 identifying the quantity of an intermediate product owed to an exchange balance at steps 516-522 in FIG. 5. This may also include demand server 108 using manufacturing information 120 to determine the amount of by-product that will be generated during production of the quantity of intermediate product owed to the exchange balances. At step 606, demand server 108 determines a quantity of the by-product that will be produced during production of at least a portion of the excess intermediate product. This may include, for example, demand server 108 using manufacturing information 120 and the predicted amount of excess intermediate product to determine the amount of the by-product that will be produced. Demand server 108 determines a total quantity of the by-product that will be produced by manufacturer 102 at step 608. This may include, for example, demand server 108 summing the amounts determined at steps 602-606, and the resulting value represents the total amount of the by-product that will be produced by manufacturer 102.

At step 610, demand server 108 determines whether all or a portion of the by-product can be disposed of through an exchange balance. This may include, for example, demand server 108 using exchange balance information 128 to determine whether an exchange balance is associated with the by-product and, if so, whether a quantity of the by-product can be supplied to another manufacturer 102 through the exchange balance. This may also include demand server 108 using one or more business rules 130 to determine whether a quantity of the by-product should be supplied through the exchange balance.

If at least a portion of the by-product can be disposed of through the exchange balance, at step 612 demand server 108 determines whether manufacturer 102 is required to supply a quantity of the by-product that is larger than the total quantity. This may include, for example, demand server 108 determining whether the terms of the exchange contract associated with the exchange balance and/or one or more business rules 130 require manufacturer 102 to supply the quantity of the by-product to the exchange balance. If manufacturer 102 is required to supply the by-product, at step 614 demand server 108 takes one or more corrective actions. In this case, manufacturer 102 is required to supply more by-product to the exchange balance than manufacturer 102 can produce. This may include, for example, demand server 108 procuring additional quantities of the by-product, reducing the amount of the by-product to be supplied to the exchange balance, increasing production of an intermediate product or an end product to stimulate production of more by-product, and/or notifying manufacturer 102 of the problem. Manufacturer 102 and/or demand server 108 may take any other or additional corrective actions without departing from the scope of the present invention.

If the quantity of the by-product owed to the exchange balance is not larger than the total quantity, at step 616 demand server 108 reduces the total quantity of the by-product to be disposed of by the quantity of the by-product to be supplied to the exchange balance. In this case, some or all of the by-product produced by manufacturer 102 may be supplied to another manufacturer 102, which reduces the amount of by-product to be disposed of by manufacturer 102. Accordingly, the manufacturer 102 may use its sales and marketing resources to generate demand for the by-product that is equal to or less than the updated total amount. This may allow, for example, manufacturer 102 to sell the remaining by-product to other manufacturers 102, suppliers 104, retailers 106, or any other persons or enterprises.

If the by-product cannot be disposed of through one or more exchange balances, at step 618 demand server 108 determines whether the total quantity of the by-product should be increased because manufacturer 102 is obligated to receive a quantity of the by-product from one or more exchange balances. This may include, for example, demand server 108 using exchange balance information 128 to determine whether an exchange balance is associated with the by-product and, if so, whether a quantity of the by-product is to be received from another manufacturer 102 through the exchange balance. This may also include demand server 108 using one or more business rules 130 to determine whether a quantity of the by-product should be received through the exchange balance. If demand server 108 determines that manufacturer 102 should receive a quantity of the by-product from the exchange balance, at step 620 demand server 108 increases the total quantity of the by-product by the quantity of the by-product to be received from the exchange balance. In this case, manufacturer 102 may need to sell a larger quantity of the by-product in order to dispose of the by-product produced during normal operations and to sell the by-product received through an exchange balance.

Although FIG. 6 illustrates determining the predicted demand for a by-product using one or more exchange balances, other embodiments of method 600 may be used without departing from the scope of the present invention. For example, a manufacturer 102 may not enter into any exchange contracts involving the by-product, and demand server 108 could determine the predicted demand for the by-product without using an exchange balance. Also, one or multiple exchange contracts may be associated with the by-product. Further, demand server 108 may both reduce the total quantity of the by-product using at least one exchange balance and increase the total quantity of the by-product using at least one other exchange balance. In addition, method 600 may be performed for one or more by-products serially, simultaneously, or otherwise.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

The invention claimed is:

1. A computer-implemented method for demand planning, comprising:
   determining, by a server, a demand value representing a demand quantity of an end product to be produced by one or more entities, production of the demand quantity of the end product comprising production of a quantity of an intermediate product using a raw material, the intermediate product to be further processed to produce the end product;
   determining, by the server, an additional quantity value representing an additional quantity of the intermediate product to be produced by the one or more entities in addition to the quantity of the intermediate product used to produce the end product, at least one of the demand value and the additional quantity value based on an exchange balance associated with at least one of the raw material, the intermediate product, and the end product, wherein the exchange balance identifies a balance representing the status of an exchange contract between the one or more entities;
   determining, by the server, a reserve value that represents the quantity of the intermediate product used to produce the end product;
   determining, by the server, a difference between a total quantity of the intermediate product to be produced by the one or more entities and the quantity of the intermediate product represented by the reserve value;
   updating, by the server, the exchange balance to reflect the difference between the total quantity of the intermediate product to be produced by the one or more entities and the quantity of the intermediate product represented by the reserve value;
   determining, by the server, a quantity of a by-product to be produced during the production of the end product;
   determining, by the server, the quantity of the by-product to be produced during the production of at least a portion of the intermediate product;
   making, by the server, the additional quantity value based on the updated exchange balance for the intermediate product available to generate additional demand for the intermediate product; and
   making, by the server, the quantity of the by-product available to generate demand for the by-product.

2. The method of claim 1, wherein determining the demand value comprises:
   determining a predicted demand value that represents a predicted demand quantity for the end product;

decreasing the predicted demand value when a quantity of the end product is obtained from an entity comprising the exchange balance; and increasing the predicted demand value when a quantity of the end product is to be supplied to the entity.

3. The method of claim 2, further comprising using at least one business rule to determine whether to obtain a quantity of the end product from or supply a quantity of the end product to the entity.

4. The method of claim 2, further comprising:
updating the exchange balance to reflect a credit associated with the one or more entities when the quantity of the end product is to be supplied to the entity, the credit representing a commitment by the one or more entities to accept a quantity of the end product from the entity; and
updating the exchange balance to reflect a debit associated with the one or more entities when the quantity of the end product is to be obtained from the entity, the debit representing a commitment by the one or more entities to supply a quantity of the end product to the entity.

5. The method of claim 2, further comprising determining whether the predicted demand value represents a quantity of the end product that is larger than a total quantity of the end product to be produced by the one or more entities.

6. The method of claim 1, further comprising:
increasing at least one of the demand value and the additional quantity value when a quantity of the raw material is obtained from an entity comprising the exchange balance; and
decreasing at least one of the demand value and the additional quantity value when a quantity of the raw material is to be supplied to the entity.

7. The method of claim 1, further comprising:
decreasing the reserve value when a quantity of the intermediate product is obtained from an entity comprising the exchange balance;
increasing the reserve value when a quantity of the intermediate product is to be supplied to the manufacturer associated with the exchange balance.

8. The method of claim 7, further comprising determining whether the reserve value represents a quantity of the intermediate product that is larger than the total quantity of the intermediate product to be produced by the one or more entities.

9. The method of claim 1, further comprising:
determining a total value representing a total quantity of the by-product that would be produced during production of the demand quantity of the end product and production of at least a portion of the additional quantity of the intermediate product;
increasing the total value when a quantity of the by-product is to be obtained from a second server associated with a second entity, the second server comprising a second exchange balance, the second exchange balance associated with at least the by-product;
decreasing the total value when a quantity of the by-product is supplied to the second entity; and
making the total value for the by-product available to generate additional demand for the by-product.

10. The method of claim 9, further comprising determining whether the quantity of the by-product to be supplied to the second entity is larger than the total quantity of the by-product.

11. The method of claim 9, wherein the end product comprises a chemical end product, the intermediate product comprises a chemical intermediate product, and the byproduct comprises a chemical by-product.

12. A computer-implemented system for demand planning, comprising:
an entity comprising a demand server, the demand server comprising a storage medium stored therein an exchange balance, the exchange balance configured to provide at least one of a raw material, an intermediate product, and an end product to one or more other entities, the demand server configured to:
determine a demand value representing a demand quantity of the end product to be produced by the one or more other entities, production of the demand quantity of the end product comprising production of a quantity of the intermediate product using the raw material, the intermediate product is further processed to produce the end product;
determine an additional quantity value representing an additional quantity of the intermediate product to be produced by the one or more other entities in addition to the quantity of the intermediate product used to produce the end product, at least one of the demand value and the additional quantity value based on the exchange balance, wherein the exchange balance identifies a balance representing the status of an exchange contract between the entity and the one or more other entities;
determine a reserve value that represents the quantity of the intermediate product used to produce the end product;
determine a difference between a total quantity of the intermediate product to be produced by the one or more entities and the quantity of the intermediate product represented by the reserve value;
update the exchange balance to reflect the difference between the total quantity of the intermediate product to be produced by the one or more entities and the quantity of the intermediate product represented by the reserve value;
determine a quantity of a by-product to be produced during the production of the end product;
determine the quantity of the by-product to be produced during the production of at least a portion of the intermediate product;
make the additional quantity value based on the updated exchange balance for the intermediate product available to generate additional demand for the intermediate product; and
make the quantity of the by-product available to generate demand for the by-product.

13. The system of claim 12, wherein the demand server is further configured to determine the demand value by:
determining a predicted demand value that represents a predicted demand quantity for the end product;
decreasing the predicted demand value when a quantity of the end product is obtained from the entity; and
increasing the predicted demand value when a quantity of the end product is to be supplied to the entity.

14. The system of claim 13, wherein the demand server is further configured to use at least one business rule to determine whether to obtain a quantity of the end product from or supply a quantity of the end product to the entity.

15. The system of claim 13, wherein the demand server is further configured to:
update the exchange balance to reflect a credit associated with the one or more other entities when the quantity of the end product is to be supplied to the entity, the credit representing a commitment by the one or more other entities to accept a quantity of the end product from the entity; and update the exchange balance to reflect a debit associated with the one or more other entities when the quantity of the end product is to be obtained from the entity, the debit representing a commitment by the one or more other entities to supply a quantity of the end product to the entity.

16. The system of claim 12, wherein the demand server is further configured to determine whether the predicted demand value represents a quantity of the end product that is larger than a total quantity of the end product to be produced by the one or more other entities.

17. The system of claim 12, wherein the demand server is further configured to:

increase at least one of the demand value and the additional quantity value when a quantity of the raw material is obtained from the entity; and decrease at least one of the demand value and the additional quantity value when a quantity of the raw material is to be supplied to the entity.

18. The system of claim 12, wherein the demand server is further configured to:

decrease the reserve value when a quantity of the intermediate product is obtained from the entity; and increase the reserve value when a quantity of the intermediate product is to be supplied to the entity.

19. The system of claim 18, wherein the demand server is further configured to determine whether the reserve value represents a quantity of the intermediate product that is larger than the total quantity of the intermediate product to be produced by the one or more other entities.

20. The system of claim 12, wherein the demand server is further configured to:

determine a total value representing a total quantity of the by-product that would be produced during production of the demand quantity of the end product and production of at least a portion of the additional quantity of the intermediate product;

increase the total value when a quantity of the by-product is to be obtained from a second demand server associated with a second entity, the second demand server comprising a second exchange balance, the second exchange balance associated with at least the by-product;

decrease the total value when a quantity of the by-product is supplied to the second entity; and make the total value for the by-product available to generate additional demand for the by-product.

21. The system of claim 20, wherein the demand server is further configured to determine whether the quantity of the by-product to be supplied to the second entity is larger than the total quantity of the by-product.

22. The system of claim 20, wherein the end product comprises a chemical end product, the intermediate product comprises a chemical intermediate product, and the byproduct comprises a chemical by-product.

23. A computer-readable media embodied with software for demand planning, the software when executed using a computer is configured to:

determine a demand value representing a demand quantity of an end product to be produced by one or more entities, production of the demand quantity of the end product comprising production of a quantity of an intermediate product using a raw material, the intermediate product to be further processed to produce the end product;

determine an additional quantity value representing an additional quantity of the intermediate product to be produced by the one or more entities in addition to the quantity of the intermediate product used to produce the end product, at least one of the demand value and the additional quantity value based on an exchange balance associated with at least one of the raw material, the intermediate product, and the end product, wherein the exchange balance identifies a balance representing the status of an exchange contract between the one or more entities;

determine a reserve value that represents the quantity of the intermediate product used to produce the end product;

determine a difference between a total quantity of the intermediate product to be produced by the one or more entities and the quantity of the intermediate product represented by the reserve value;

update the exchange balance to reflect the difference between the total quantity of the intermediate product to be produced by the one or more entities and the quantity of the intermediate product represented by the reserve value;

determine a quantity of a by-product to be produced during the production of the end product;

determine the quantity of the by-product to be produced during the production of at least a portion of the intermediate product;

make the additional quantity value based on the updated exchange balance for the intermediate product available to generate additional demand for the intermediate product; and make the quantity of the by-product available to generate demand for the by-product.

24. A computer-implemented method for demand planning, comprising:

determining, by a server, a demand value representing a demand quantity of an end product to be produced by one or more entities, production of the demand quantity of the end product comprising production of a quantity of an intermediate product to be further processed to produce the end product and a quantity of a by-product that is not to be further processed to produce the end product;

determining, by the server, an additional quantity value representing an additional quantity of the intermediate product to be produced by the one or more entities in addition to the quantity of the intermediate product used to produce the end product;

determining, by the server, a quantity value representing a quantity of the by-product that would be produced during production of the end product, at least one of the demand value and the quantity value based on an exchange balance associated with at least one of the raw material, the by-product, and the end product, wherein the exchange balance identifies a balance representing the status of an exchange contract between the one or more entities;

determining, by the server, a reserve value that represents the quantity of the intermediate product used to produce the end product;

determining, by the server, a difference between a total quantity of the intermediate product to be produced by the one or more entities and the quantity of the intermediate product represented by the reserve value;

updating, by the server, the exchange balance to reflect the difference between the total quantity of the intermediate product to be produced by the one or more entities and the quantity of the intermediate product represented by the reserve value;

making, by the server, the additional quantity value based on the updated exchange balance for the intermediate product available to generate additional demand for the intermediate product; and making, by the server, the quantity value for the by-product available to generate additional demand for the by-product.

25. The method of claim 24, further comprising:

determining a total quantity value representing a total quantity of the by-product that would be produced during production of the end product and production of at least a portion of the additional quantity of the intermediate product.

26. The method of claim 25, further comprising:

decreasing the reserve value when a quantity of the intermediate product is obtained from a second server associated with a second entity, the second server comprising a second exchange balance, the second exchange balance associated with at least the intermediate product; and increasing the reserve value when a quantity of the intermediate product is to be supplied to the second entity.

27. The method of claim 25, wherein the end product comprises a chemical end product, the intermediate product comprises a chemical intermediate product, and the by-product comprises a chemical by-product.

28. A computer-implemented system for demand planning, comprising:

an entity comprising a demand server comprising a storage medium stored therein an exchange balance, the exchange balance configured to provide at least one of a raw material, a by-product, and an end product to one or more other entities, the demand server configured to:

determine a demand value representing a demand quantity of the end product to be produced by the one or more other entities, production of the demand quantity of the end product comprising production of a quantity of an intermediate product to be further processed to produce the end product and a quantity of the by-product that is not further processed to produce the end product;

determine an additional quantity value representing an additional quantity of the intermediate product to be produced by the one or more other entities in addition to the quantity of the intermediate product used to produce the end product;

determine a quantity value representing a quantity of the by-product that would be produced during production of the end product, at least one of the demand value and the quantity value based on the exchange balance, wherein the exchange balance identifies a balance representing the status of an exchange contract between the one or more other entities;

determine a reserve value that represents the quantity of the intermediate product used to produce the end product;

determine a difference between a total quantity of the intermediate product to be produced by the entity and the quantity of the intermediate product represented by the reserve value;

update the exchange balance to reflect the difference between the total quantity of the intermediate product to be produced by the one or more entities and the quantity of the intermediate product represented by the reserve value;

make the additional quantity value based on the updated exchange balance for the intermediate product available to generate additional demand for the intermediate product; and make the quantity value for the by-product available to generate additional demand for the by-product.

29. The system of claim 28, wherein the demand server is further configured to:

determine a total quantity value representing a total quantity of the by-product that would be produced during production of the end product and production of at least a portion of the additional quantity of the intermediate product.

30. The system of claim 29, wherein the demand server is further configured to:

decrease the reserve value when a quantity of the intermediate product is obtained from a second demand server associated with a second entity, the second demand server comprising a second exchange balance, the second exchange balance associated with at least the intermediate product; and increase the reserve value when a quantity of the intermediate product is to be supplied to the second entity.

31. The system of claim 29, wherein the end product comprises a chemical end product, the intermediate product comprises a chemical intermediate product, and the by-product comprises a chemical by-product.

32. A computer-readable media embodied with software for demand planning, the software when executed using a computer is configured to:

determine a demand value representing a demand quantity of an end product to be produced by one or more entities, production of the demand quantity of the end product comprising production of a quantity of a quantity of an intermediate product to be further processed to produce the end product and a by-product that is not to be further processed to produce the end product;

determine an additional quantity value representing an additional quantity of the intermediate product to be produced by the one or more entities in addition to the quantity of the intermediate product used to produce the end product;

determine a quantity value representing a quantity of the by-product that would be produced during production of the end product, at least one of the demand value and the quantity value based on an exchange balance associated with at least one of the raw material, the by-product, and the end product, wherein the exchange balance identifies a balance representing the status of an exchange contract between the one or more entities;

determine a reserve value that represents the quantity of the intermediate product used to produce the end product;

determine a difference between a total quantity of the intermediate product to be produced by the one or more entities and the quantity of the intermediate product represented by the reserve value;

update the exchange balance to reflect the difference between the total quantity of the intermediate product to be produced by the one or more entities and the quantity of the intermediate product represented by the reserve value;

make the additional quantity value based on the updated exchange balance for the intermediate product available to generate additional demand for the intermediate product; and make the quantity value for the by-product available to generate additional demand for the by-product.

33. A computer-implemented system for demand planning, comprising:

an entity comprising a demand server, the demand server comprising a storage medium stored therein an exchange balance, the exchange balance comprising:

means for providing at least one of a raw material, an intermediate product, a by-product to one or more other entities;

means for determining a demand value representing a demand quantity of the end product to be produced by the one or more other entities, production of the demand quantity of the end product comprising production of a quantity of the intermediate product using the raw material, the intermediate product to be further processed to produce the end product, production of at least one of the intermediate product and the end product comprising production of a quantity of the by-product that is not to be further processed to produce the end product;

means for determining an additional quantity value representing an additional quantity of the intermediate product to be produced by the one or more other entities in addition to the quantity of the intermediate product used to produce the end product;

means for determining a total quantity value representing a total quantity of the by-product that would be produced during production of the demand quantity of the end product and production of at least a portion of the additional quantity of the intermediate product, at least one of the demand value, the additional quantity value, and the total quantity value based on the exchange balance, wherein the exchange balance identifies a balance representing the status of an exchange contract between the entity and the one or more other entities;

means for determining a reserve value that represents the quantity of the intermediate product used to produce the end product;

means for determining a difference between a total quantity of the intermediate product to be produced by the one or more entities and the quantity of the intermediate product represented by the reserve value;

means for updating the exchange balance to reflect the difference between the total quantity of the intermediate product to be produced by the one or more entities and the quantity of the intermediate product represented by the reserve value; and means for making the additional quantity value based on the updated exchange balance for the intermediate product and the total quantity value for the by-product available to generate additional demand for the intermediate product and the by-product.

34. A computer-implemented system for demand planning, comprising:

an entity comprising a demand server comprising a storage medium stored therein an exchange balance, the exchange balance configured to provide at least one of a raw material, an intermediate product, a by-product, and an end product to one or more other entities, the demand server containing:

a demand value representing a demand quantity of the end product to be produced by the one or more other entities, production of the demand quantity of the end product comprising production of a quantity of the intermediate product using the raw material, the intermediate product to be further processed to produce the end product, production of at least one of the intermediate product and the end product comprising production of a quantity of the by-product that is not to be further processed to produce the end product; and a value representing a total quantity of the intermediate product to be produced by the one or more other entities; and the demand server configured to:

determine the demand value for the end product;

determine an additional quantity value representing an additional quantity of the intermediate product to be produced by the one or more other entities in addition to the quantity of the intermediate product used to produce the end product; and determine a total quantity value representing a total quantity of the by-product that would be produced during production of the demand quantity of the end product and production of at least a portion of the additional quantity of the intermediate product, at least one of the demand value, the additional quantity value, and the total quantity value based on the exchange balance, wherein the exchange balance identifies a balance representing the status of an exchange contract between the entity and the one or more other entities;

determine a reserve value that represents the quantity of the intermediate product used to produce the end product;

determine a difference between a total quantity of the intermediate product to be produced by the one or more entities and the quantity of the intermediate product represented by the reserve value;

update the exchange balance to reflect the difference between the total quantity of the intermediate product to be produced by the one or more entities and the quantity of the intermediate product represented by the reserve value; and make the additional quantity value based on the updated exchange balance for the intermediate product and the total quantity value for the by-product available to generate additional demand for the intermediate product and the by-product.

35. A computer-implemented method for demand planning, comprising:

determining, by a server, a demand value representing a demand quantity of an end product to be produced by one or more entities, production of the demand quantity of the end product comprising production of a quantity of an intermediate product using a raw material, the intermediate product to be further processed to produce the end product, production of at least one of the intermediate product and the end product comprising production of a quantity of a by-product that is not to be further processed to produce the end product;

determining, by the server, an additional quantity value representing an additional quantity of the intermediate product to be produced by the one or more entities in addition to the quantity of the intermediate product used to produce the end product, the additional quantity value determined using a total quantity value representing a total quantity of the intermediate product to be produced by the one or more entities produce;

determining, by the server, a total quantity value representing a total quantity of the by-product that would be produced during production of the demand quantity of the end product and production of at least a portion of the additional quantity of the intermediate product, at least one of the demand value, the additional quantity value, and the total quantity value based on an exchange balance associated with a manufacturer, the exchange balance identifies a balance representing the status of an exchange contract between the manufacturer and the one or more entities, wherein the manufacturer may supply at least one of the raw material, the intermediate product, the by-product, and the end product to the one or more entities, and wherein the one or more entities supply at least one of the raw material, the intermediate product, the by-product, and the end product to the manufacturer;

determining, by the server, a reserve value that represents the quantity of the intermediate product used to produce the end product;

determining, by the server, a difference between a total quantity of the intermediate product to be produced by the one or more entities and the quantity of the intermediate product represented by the reserve value;

updating, by the server, the exchange balance to reflect the difference between the total quantity of the intermediate product to be produced by the one or more entities and the quantity of the intermediate product represented by the reserve value; and making, by the server, the additional quantity value based on the updated exchange balance for the intermediate product and the total quantity value for the by-product available to generate additional demand for the intermediate product and the by-product.

* * * * *

UNITED STATES PATENT AND TRADEMARK OFFICE
CERTIFICATE OF CORRECTION

PATENT NO. : 7,640,180 B1  Page 1 of 1
APPLICATION NO. : 10/103384
DATED : December 29, 2009
INVENTOR(S) : Slocum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Ninth Day of November, 2010

David J. Kappos
*Director of the United States Patent and Trademark Office*